United States Patent [19]
Claydon et al.

[11] Patent Number: 5,227,961
[45] Date of Patent: Jul. 13, 1993

[54] SYMMETRICAL DELAY CIRCUIT

[75] Inventors: Glenn S. Claydon, Troy; William J. Laughton, Syracuse, both of N.Y.

[73] Assignee: General Electric Company, Schenectady, N.Y.

[21] Appl. No.: 811,331

[22] Filed: Dec. 20, 1991

Related U.S. Application Data

[62] Division of Ser. No. 551,812, Jul. 2, 1990, Pat. No. 5,099,202.

[51] Int. Cl.[5] .................. H03K 5/04; H02H 7/122
[52] U.S. Cl. ...................... 363/17; 307/602; 363/98; 363/132; 363/56
[58] Field of Search ............. 363/17, 98, 56, 132; 307/601, 602, 595

[56] References Cited

U.S. PATENT DOCUMENTS

| 4,586,118 | 4/1986 | Mihalka | 363/17 |
| 4,675,546 | 6/1987 | Shaw | 307/265 |
| 4,694,384 | 9/1987 | Steigerwald et al. | 363/17 |
| 4,733,104 | 3/1988 | Steigerwald et al. | 307/260 |
| 4,800,477 | 1/1989 | Esposito | 363/17 |
| 4,847,743 | 7/1989 | Kamiyama | 363/41 |
| 4,967,332 | 10/1990 | Claydon et al. | 363/17 |

Primary Examiner—Steven L. Stephan
Assistant Examiner—Ben Davidson
Attorney, Agent, or Firm—Jill M. Breedlove; Marvin Snyder

[57] ABSTRACT

Dead time circuitry for ensuring that no two switching devices in a half-bridge, or in the same leg of a full-bridge, are conductive simultaneously employs a symmetrical delay circuit which independently delays the rising and falling edges of each signal pulse.

1 Claim, 7 Drawing Sheets

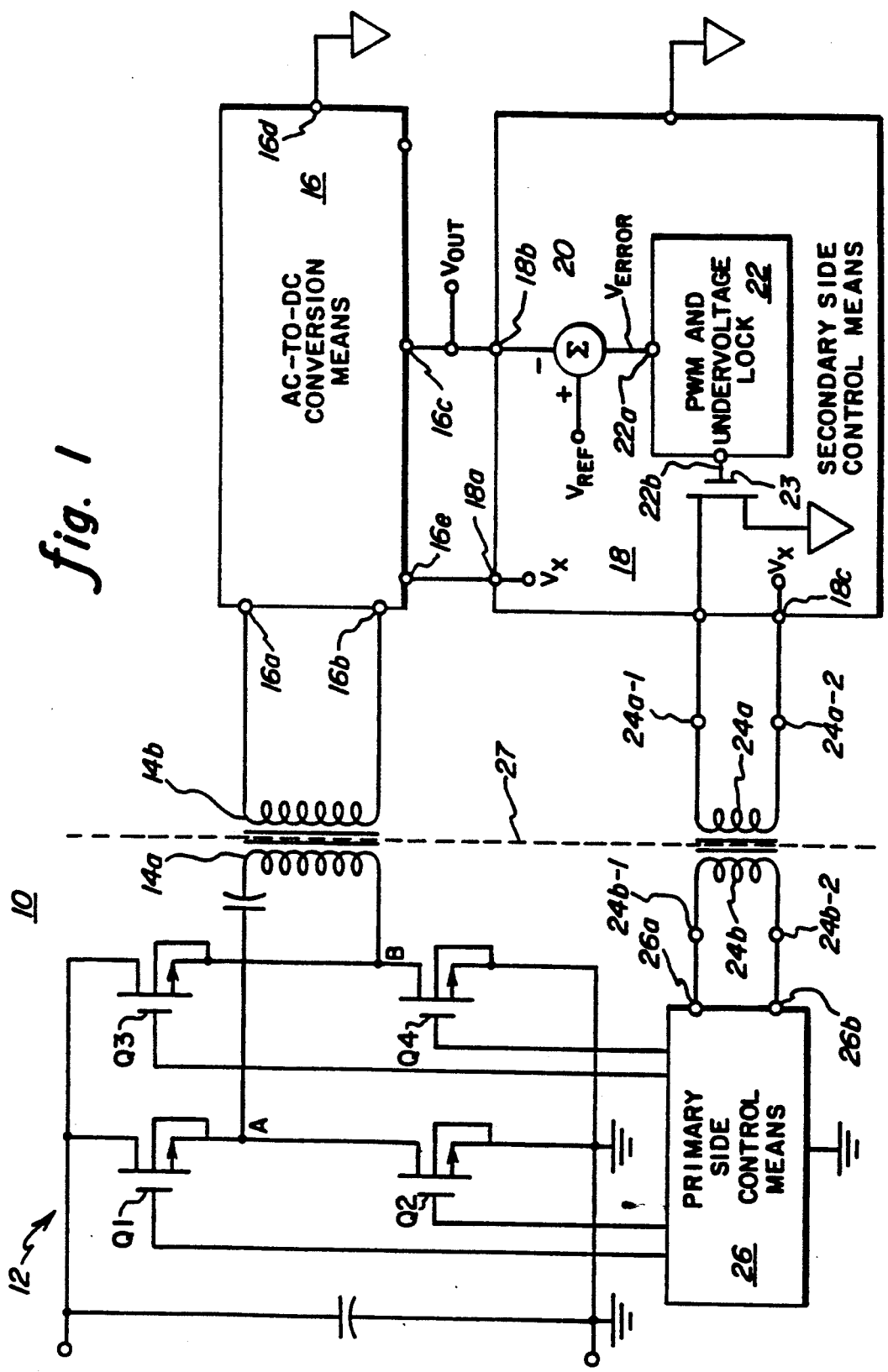

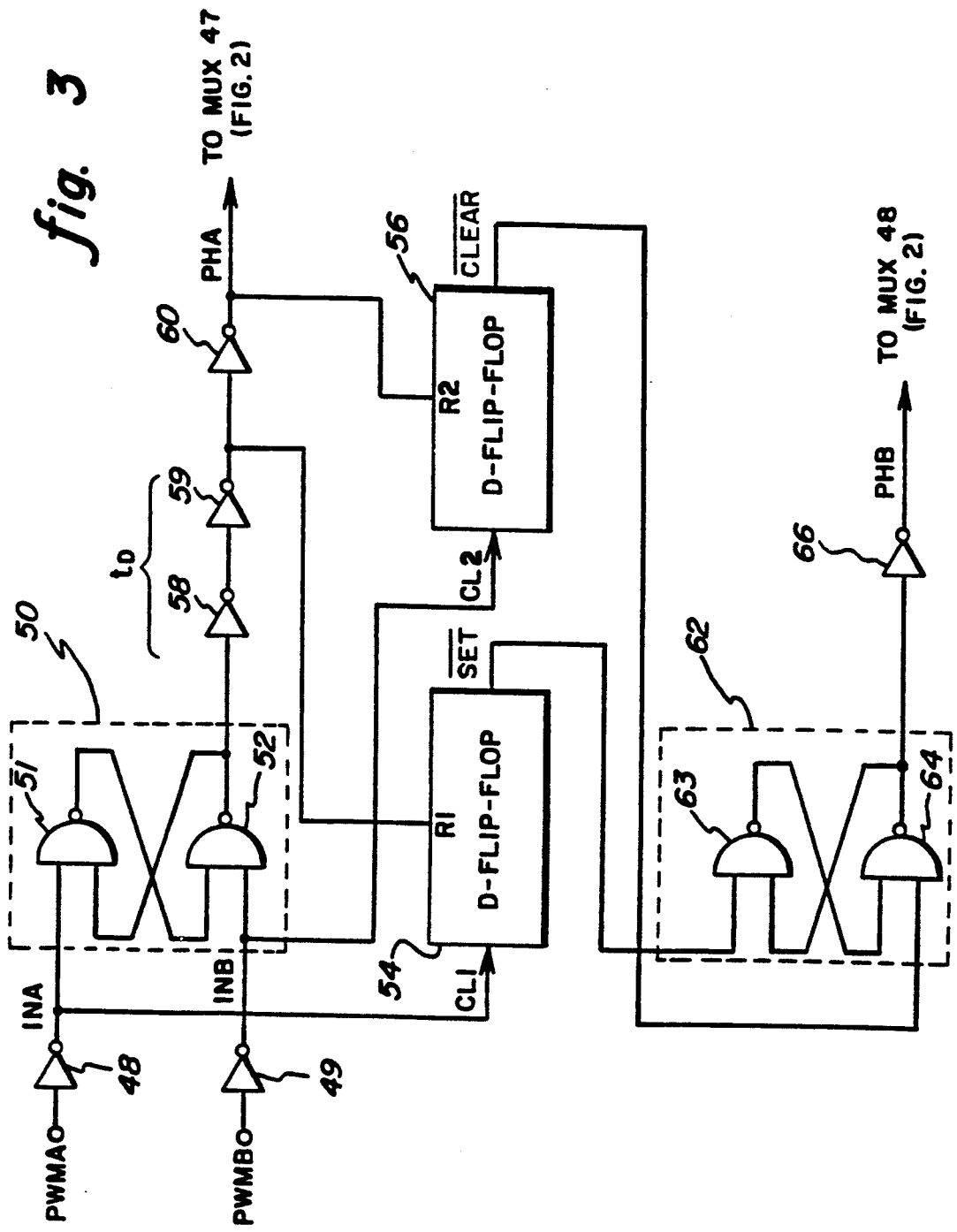

SYMMETRICAL DELAY CIRCUIT

This application is a division of application Ser. No. 07/551,812, filed Jul. 2, 1990, U.S. Pat. No. 5,099,202.

FIELD OF THE INVENTION

The present invention relates generally to power supplies. More particularly, the present invention relates to a high voltage integrated circuit (HVIC) primary side power supply controller, including a full-bridge/half-bridge driver, which is operable in multiple control modes.

BACKGROUND OF THE INVENTION

Increasing the power density of power supplies has been a major concern in recent years. Such concern has led to advancements in high frequency capacitive and magnetic components which are small and efficient. Moreover, there have been significant developments in HVIC power supply technology. For example, an HVIC DC-to-DC conversion type power supply employing a half-bridge converter is described in Steigerwald et al. U.S. Pat. No. 4,694,384, issued Sep. 15, 1987 and assigned to the instant assignee. The HVIC power supply of the Steigerwald et al. patent, which is hereby incorporated by reference, has a two-chip architecrure for primary side and secondary side control. The primary side control chip employs a digital data detector for communication with the secondary side control chip via a pulse transformer. Advantageously, the Steigerwald et al. power supply may be operated in either a pulse width modulated (PWM) mode or a resonant mode.

The small size and versatility of the hereinabove described Steigerwald et al. power supply make it attractive for many commercial half-bridge power supply applications. However, it is desirable to reduce power supply size even further, while increasing versatility to operate in additional control modes. Furthermore, it is desirable to provide an HVIC control chip having the capability of controlling either a full-bridge or a half-bridge power supply in multiple control modes, as desired.

OBJECTS OF THE INVENTION

Accordingly, it is an object of the present invention to provide a new and improved power supply, including HVIC control means, which is operable both as a full-bridge and half-bridge supply and in multiple control modes, including PWM, resonant, and phase-shift modes.

Another object of the present invention is to provide a primary side controller for a full-bridge or half-bridge power supply which is operable in multiple control modes and capable of being implemented on a single HVIC chip.

Still another object of the present invention is to provide a high density power supply operable in multiple control modes, which is relatively small and simple in construction.

SUMMARY OF THE INVENTION

The foregoing and other objects are achieved in a new and improved HVIC primary side controller for a power supply, including a full-bridge/half-bridge driver, which is operable in multiple control modes and is capable of being implemented on a single HVIC chip.

The primary side controller of the present invention comprises drive means for driving four power switching devices in a full-bridge power converter or two switching devices in a half-bridge power converter. Dead time circuit means for ensuring that no two switching devices in a half-bridge, or in the same leg of a full-bridge, are conducting simultaneously, thus avoiding shoot-through, comprises symmetrical delay means for independently delaying the rising and falling edges of each signal pulse.

The primary side control means of the present invention includes pulse control means for controlling operation in PWM, resonant, and phase-shift control modes. In the phase-shift control mode, a phase shift generator receives two input pulse train signals and generates two output pulse train signals, each having a 50% duty cycle, which are phase-shifted in a range from 0° to 180° by an amount proportional to the duty cycle of the input pulse train signals. Furthermore, the amount of phase shift is directly proportional to the power supply load requirement.

BRIEF DESCRIPTION OF THE DRAWINGS

The features and advantages of the present invention will become apparent from the following detailed description of the invention when read with the accompanying drawings in which:

FIG. 1 is a schematic illustration of a full-bridge power supply employing a primary side controller in accordance with a preferred embodiment of the present invention;

FIG. 3 is a schematic diagram of a preferred embodiment of a phase shift generator useful in the primary side controller of FIG. 2;

DETAILED DESCRIPTION OF THE INVENTION

Figure 2A:
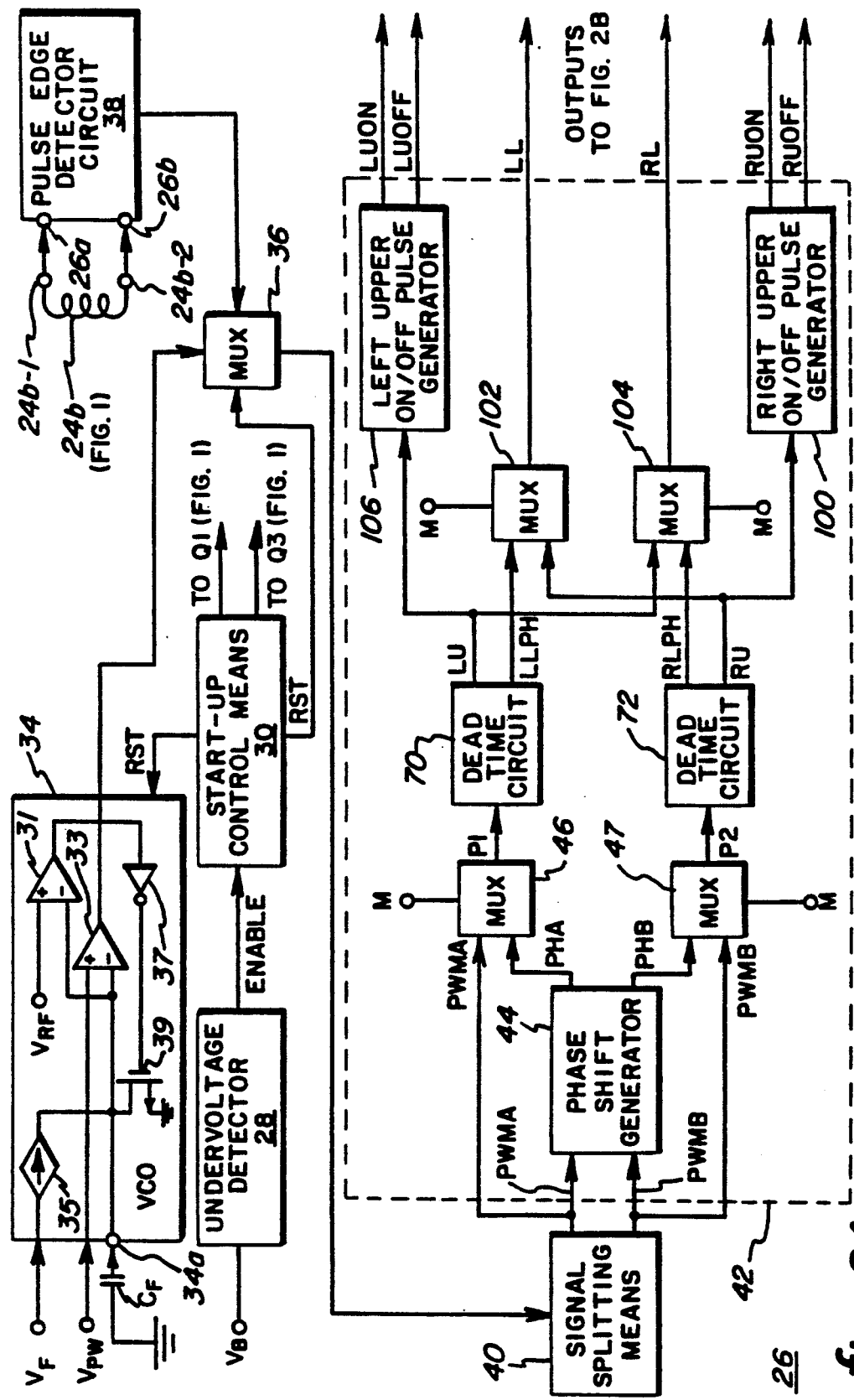
FIGS. 2A and 2B together comprise a functional block diagram of a preferred embodiment of the primary side power supply controller of the present invention.

FIG. 1 illustrates a power supply 10 employing a primary side chopping means 12 which comprises switching devices $Q_1$, $Q_2$, $Q_3$, and $Q_4$ connected in a full-bridge configuration. In particular, a left upper switching device $Q_1$ is connected in series with a left lower switching device $Q_2$ with a junction A therebetween to form a first half-bridge; and a right upper switching device $Q_3$ is connected in series with a right lower switching device $Q_4$ with a junction B therebetween to form a second half-bridge. The first and second half-bridges are connected in parallel between a conductor at a relatively high potential $V_A$ and a conductor at ground potential to form the aforementioned full-bridge configuration. In accordance with one aspect of the present invention, the chopping means may be driven as either a half-bridge power converter or a full-bridge power converter, as desired, as described hereinbelow. A primary winding 14a of a high frequency transformer 14 is coupled between junctions A and B of chopping means 12. The chopping means provides a driving waveform to primary winding 14a which may be substantially sinusoidal, for a resonant converter supply, or may be substantially rectangular with variable duty cycle, for a PWM or phase-shift controlled power supply. A secondary winding 14b of transformer 14 is connected to first and second input terminals 16a and 16b of an AC-to-DC conversion means 16 for providing an output voltage $V_{OUT}$ of a desired substantially constant magnitude at an output 16c with respect to a secondary side common connection 16d. AC-to-DC conversion means 16 also provides a second voltage voltage $V_X$ at a second output 16e for connection to an operating potential input 18a of a secondary side control means 18. Secondary side control means is implemented on a conventional low voltage integrated circuit chip.

Secondary side control means 18 has another input 18b for connection of voltage $V_{OUT}$ from AC-to-DC conversion means 16. Voltage $V_{OUT}$ is compared in a summing means 20 with a reference voltage $V_{REF}$. The resulting error signal $V_{REF}$ is provided to an input 22a of a PWM generator/undervoltage lockout means 22 of a type well-known in the art, e.g. comprising a comparator with hysteresis. Lockout means 22 allows a pulse train signal at an output 22b if the chip's operating potential $V_X$ is greater than a predetermined lockout amplitude. In particular, the pulse train comprises a digital, i.e. binary-level, signal having a frequency and/or pulse width corresponding to the magnitude and polarity of the error voltage $V_{ERR}$ at input 22a. The pulse train signal at output 22b is supplied to the gate of a field-effect transistor (FET) switching device 23 which controls the signal between primary terminals 24a-1 and 24a-2 of an isolation coupling means 24. Isolation coupling means 24 maintains ohmic isolation between secondary side control means 18 and a primary side control means 26. Primary side control means 26 is implemented on a HVIC chip. In FIG. 1, dashed line 27 represents the isolation between the power supply primary side and the power supply secondary side provided by transformers 14 and 24.

As shown, a preferred embodiment of isolation coupling means 24 comprises a small pulse transformer having a primary winding 24a connected between primary side terminals 24a-1 and 24a-2 of pulse transformer 24, and a secondary winding 24b connected between secondary terminals 24b-1 and 24b-2. Primary terminals 24a-1 and 24a-2 are connected between operating voltage $V_X$ at terminal 18c and the controlled conduction circuit of FET 23. Each pulse of current caused to flow through primary winding 24a results in a voltage between secondary terminals 24b-1 and 24b-2, and hence between input terminals 26a and 26b, of the primary side control means HVIC chip. In an alternative embodiment, isolation coupling means 24 comprises an optoisolator of a type well-known in the art. The aforementioned types of isolation coupling means for maintaining ohmic isolation between a primary side power supply controller HVIC chip and a secondary side power supply controller chip are described in Steigerwald et al. U.S. Pat. No. 4,694,384, cited hereinabove.

In accordance with the present invention, primary side control means 26 comprises drive means for driving chopping means 12 as either a full-bridge or half-bridge power converter. In another aspect of the present invention, primary side control means 26 comprises means for controlling power supply 10 in PWM, resonant, or phase-shift control modes, as desired.

Figure 2B:
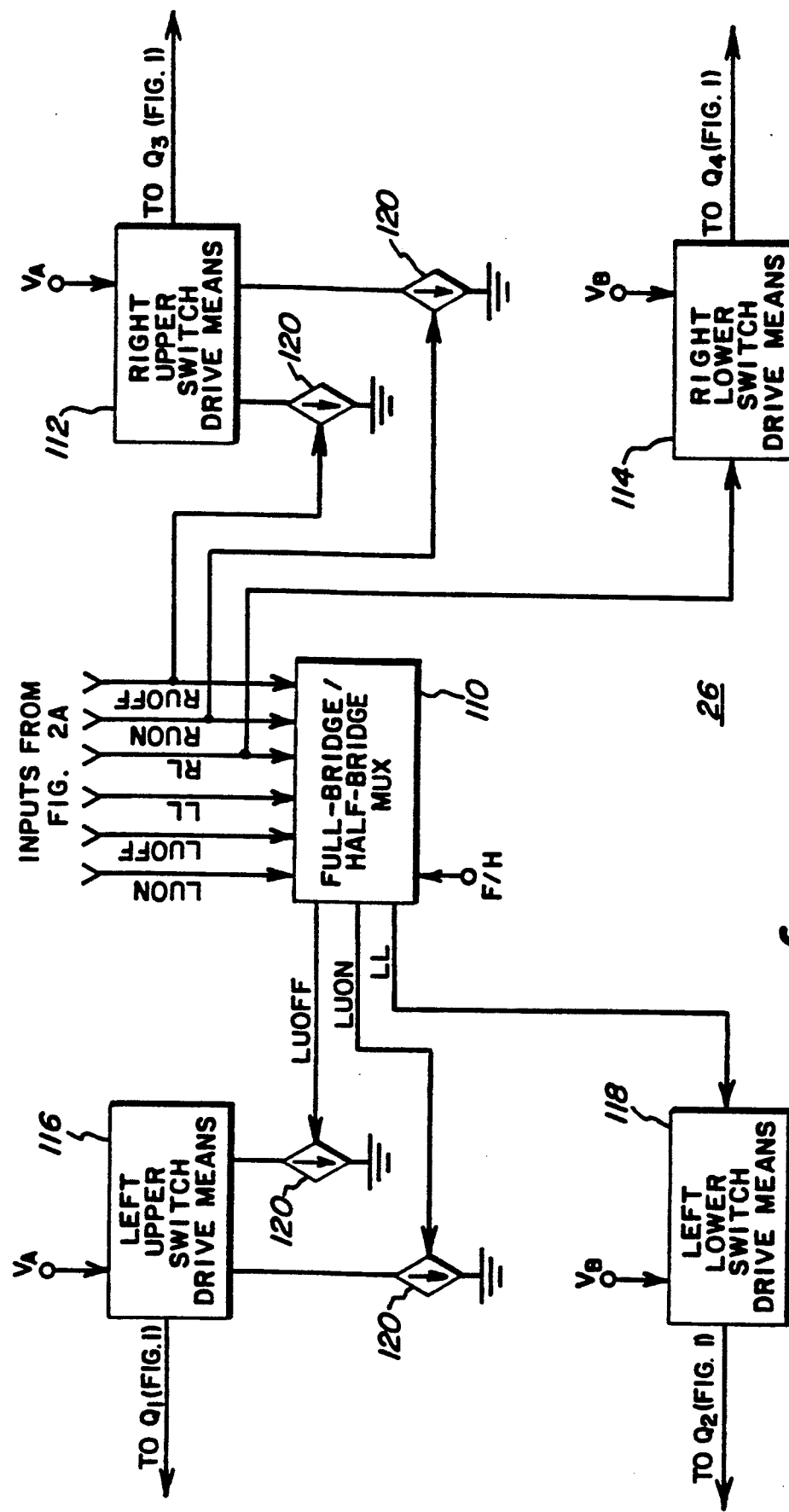

FIGS. 2A and 2B together comprise a functional block diagram of primary side control means 26 in accordance with a preferred embodiment of the present invention. An undervoltage detector 28 of a type well-known in the art, such as undervoltage lock 22 of FIG. 2A, is provided to monitor the relatively low operating voltage $V_B$ of primary side controller chip 26. Undervoltage detector 28 preferably comprises means for adjusting the lockout amplitude and adjustable hysteresis means for preventing noise at its output. If the operating potential $V_B$ of primary side controller chip 26 is greater than a predetermined lockout amplitude, then an enable signal will be supplied to a start-up control means 30. In particular, when the relatively low operating voltage level $V_B$ is attained, start-up control means 30 provides a current pulse to the right upper and left upper switching devices $Q_1$ and $Q_3$, respectively, in order to ensure that the upper switching devices are off upon start-up, thus preventing shoot-through (i.e., both devices in a half-bridge being conductive simultaneously). Furthermore, start-up control means 30 provides a reset signal RST to a voltage-controlled oscillator (VCO) 34 in response to chip operating voltage $V_B$ being attained. This RST signal allows the VCO to initiate a soft-start.

VCO 34 is of a type well-known in the art comprising a ramp generator including two voltage comparators 31 and 33 for determining frequency and pulse width, respectively, of an output pulse train. (These hysteresis comparators are hereinafter designated as the frequency comparator and the pulse width comparator, respectively.) In operation, frequency of a voltage ramp signal from the ramp generator is controlled as a function of an input voltage $V_F$ which sets the charging current, via a voltage-controlled current source 35, for a timing capacitor $C_F$ coupled to an input 34a of VCO 34. The voltage ramp is compared to an internally set reference voltage $V_{RF}$ in frequency comparator 31. When the reference voltage $V_{RF}$ is reached, the output signal from frequency comparator 31 goes low and is inverted by an inverter 37 to provide a high logic level signal to turn on a switching device 39. Timing capacitor $C_F$ is discharged through switching device 39, after which a new timing cycle begins. In pulse width comparator 33, an input voltage $V_{PW}$ is compared with the ramp voltage to determine the pulse width of the output pulse train. In particular, when the ramp exceeds voltage $V_{PW}$, pulse width comparator 33 terminates the on-time of the output pulse. The output pulse train from VCO 34 is supplied to a multiplexing means (MUX) 36.

Another input signal to MUX 36 comprises an output pulse train from a pulse edge detector circuit 38. The pulse edge detector circuit is connected to input terminals 26a and 26b of primary side control means 26. A preferred embodiment of pulse edge detector circuit 38 is described in Steigerwald et al. U.S. Pat. No. 4,694,384, cited hereinabove. In operation, the pulse edge detector circuit detects and reconstructs the digital data signal edge transitions which appear at secondary terminals 24b-1 and 24b-2 of pulse transformer 24. Advantageously, since the pulse edge detector circuit senses only pulse edges, the pulse transformer does not have to be capable of remaining unsaturated for each entire pulse width generated by the secondary side control means and can, therefore, be relatively small. The resultant pulse train from pulse edge detector circuit 38 is provided to MUX 36. The RST signal is supplied to MUX 36 from start-up control means 30 to ensure that the output signal from MUX 36 is initially the pulse train generated by VCO 34. Specifically, during start-up operation, the output signal from MUX 36 is the output pulse train from VCO 34 which is generated on the primary side of the power supply. On the other hand, during normal "run" operation, the output signal from MUX 36 is the output signal from pulse edge detector circuit 38 which originates on the secondary side from the secondary side error voltage $V_{ERR}$ used for power supply output voltage regulation.

The output pulse train from MUX 36 is supplied to a signal splitting means 40 for splitting the pulse train into two separate pulse trains PWMA and PWMB which are 180° out of phase with each other and are generated at one-half the frequency of the original input pulse train from MUX 36. These two pulse trains PWMA and PWMB are provided to a pulse train control means 42 which processes these signals in accordance with the present invention to provide drive signals to chopping means 12 (FIG. 1), as required, depending upon the particular control mode being employed, i.e. PWM, resonant, or phase-shift control.

Pulse trains PWMA and PWMB are each supplied to a phase shift generator 44 and to separate respective MUXes 46 and 47. A mode selection input signal M is provided to MUXes 46 and 47 to determine whether the phase shift control mode is to be employed. If not, the output signals P1 and P2 from MUXes 46 and 47, respectively, comprise pulse trains PWMA and PWMB, respectively, and operation will continue in either PWM or resonant mode. However, if the phase shift control mode is to be employed, the output signals P1 and P2 from MUXes 46 and 47, respectively, comprise the output signals PHA and PHB from phase shift generator 44. Output signals PHA and PHB from phase shift generator 44 comprise two 50% duty cycle pulse trains which are phase-shifted with respect to each other by an amount proportional to the duty cycle of the input pulse trains PWMA and PWMB received from signal splitting means 40. Specifically, zero to 50% duty cycle input pulse trains yield output signals PHA and PHB phase-shifted with respect to each other in a range from zero to 180°, respectively corresponding to operation from no-load to full-load.

A preferred embodiment of phase shift generator 44 is illustrated in FIG. 3. Pulse trains PWMA and PWMB are each supplied to an inverter 48 and 49 ,respectively, resulting in inverted pulse train signals INA and INB, respectively. The output signal INA from inverter 48 is provided to an input of a latch circuit 50, which comprises NAND gates 51 and 52. As shown, in latch circuit 50, one input of each of NAND gates 51 and 52 is cross-coupled to the output of the other NAND gate. The output signal INA from inverter 48 is also provided to the clock input CL1 of a D-type flip-flop 54. Similarly, the output signal INB from inverter 49 is provided to an input of latch circuit 50 and also to the clock input CL2 of a second D-type flip-flop 56. The output signal from latch circuit 50 is supplied to delay circuitry $t_D$, shown in FIG. 3 as comprising two cascade-coupled inverters 58 and 59. The output signal from delay circuitry $t_D$ is supplied to the reset input R1 of D-type flip-flop 54 and to another inverter 60 which provides phase-shifted drive signal PHA to MUX 46 (FIG. 2A). The output signal from inverter 60 is also provided to the reset input R2 of D-type flip-flop 56. The output signals from D-type flip-flops 54 and 56 are provided to a second latch circuit 62, which comprises NAND gates 63 and 64 cross-coupled as in latch circuit 50. The output signal from latch circuit 64 is inverted by an inverter 66 to provide phase-shifted drive signal PHB to MUX 47 (FIG. 2A).

Figure 4:
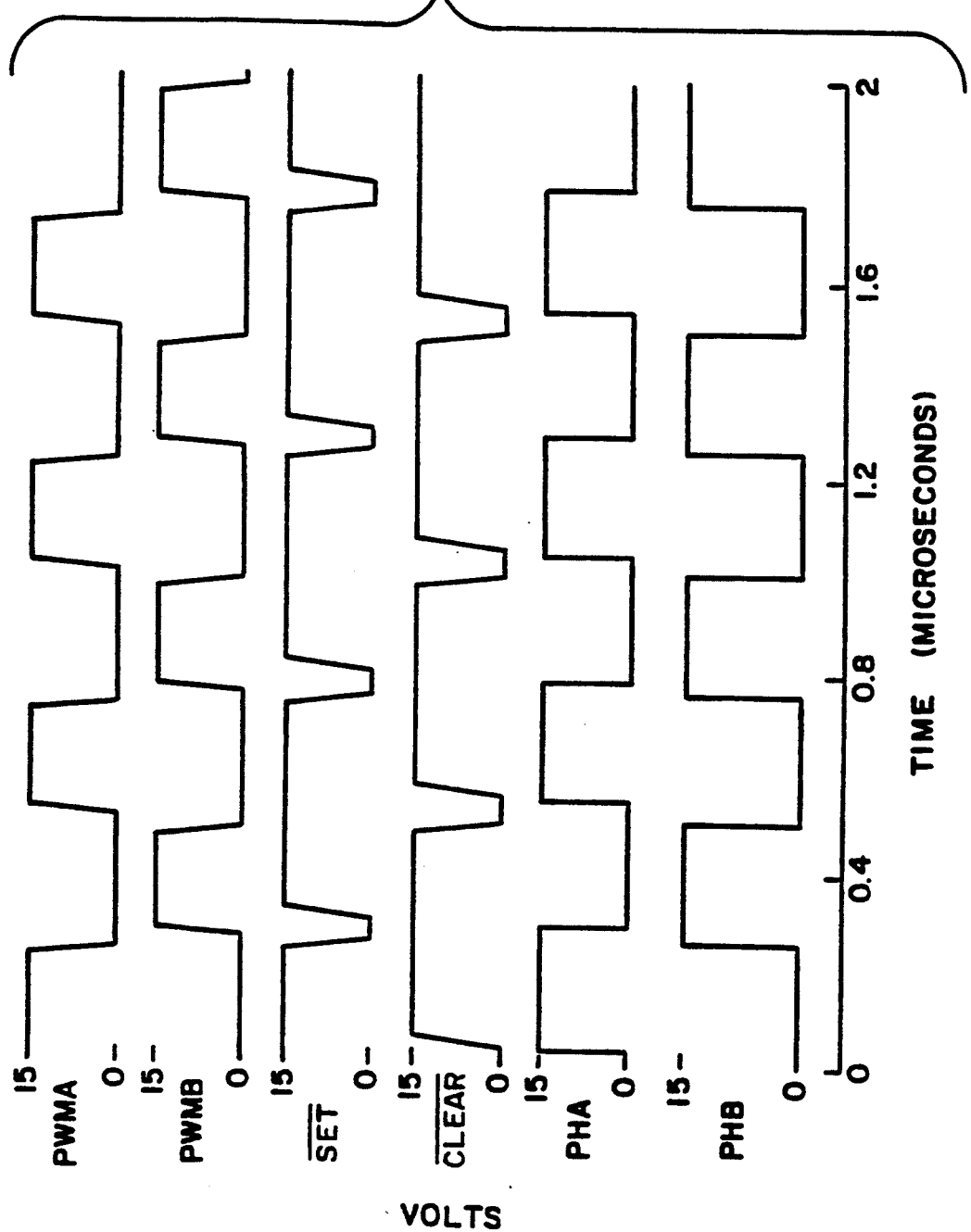
FIG. 4 is a timing diagram useful in understanding the phase shift generator of FIG. 3.

Operation of phase shift generator 44 will be best understood with reference to the timing diagram of FIG. 4. By way of example, pulse trains PWMA and PWMB are shown in FIG. 4 as signals each having a 40% duty cycle. Inverted signals INA and INB respectively comprise the clock signals CL1 and CL2 to D-type flip-flops 54 and 56 sc that rising and falling edges of phase-shifted drive signal PHA are respectively controlled by the rising edges of input pulse trains PWMA and PWMB. On the other hand, the rising and falling edges of phase-shifted drive signal PHB are respectively controlled by the falling edges of input pulse trains PWMA and PWMB. The output signals from D-type flip-flops 54 and 56 respectively comprise the $\overline{SET}$ and $\overline{CLEAR}$ signals to latch circuit 62, as illustrated in FIG. 4. The pulse width of phase-shifted drive signals PHA and PHB is always one-half the period (i.e. 50% duty cycle), and the phase shift between PHA and PHB varies directly with the duty cycle of input signals PWMA and PWMB. The amount by which phase-shifted drive signals PHA and PHB overlap is inversely proportional to the amount of power supplied to the load. That is, at no-load operation, the pulses completely overlap, while at full load operation, there is ideally no overlap.

As shown in FIG. 2A, output pulse trains P1 and P2 from MUXes 46 and 47 are respectively supplied to dead time circuits 70 and 72 for establishing a "dead" time during which neither of the switching devices in the corresponding half-bridge is conducting, hence preventing shoot-through. Preferably, dead time circuits 70 and 72 each comprise symmetrical delay means for independently controlling the timing of the rising and falling edges of the pulses supplied thereto.

Figure 5:
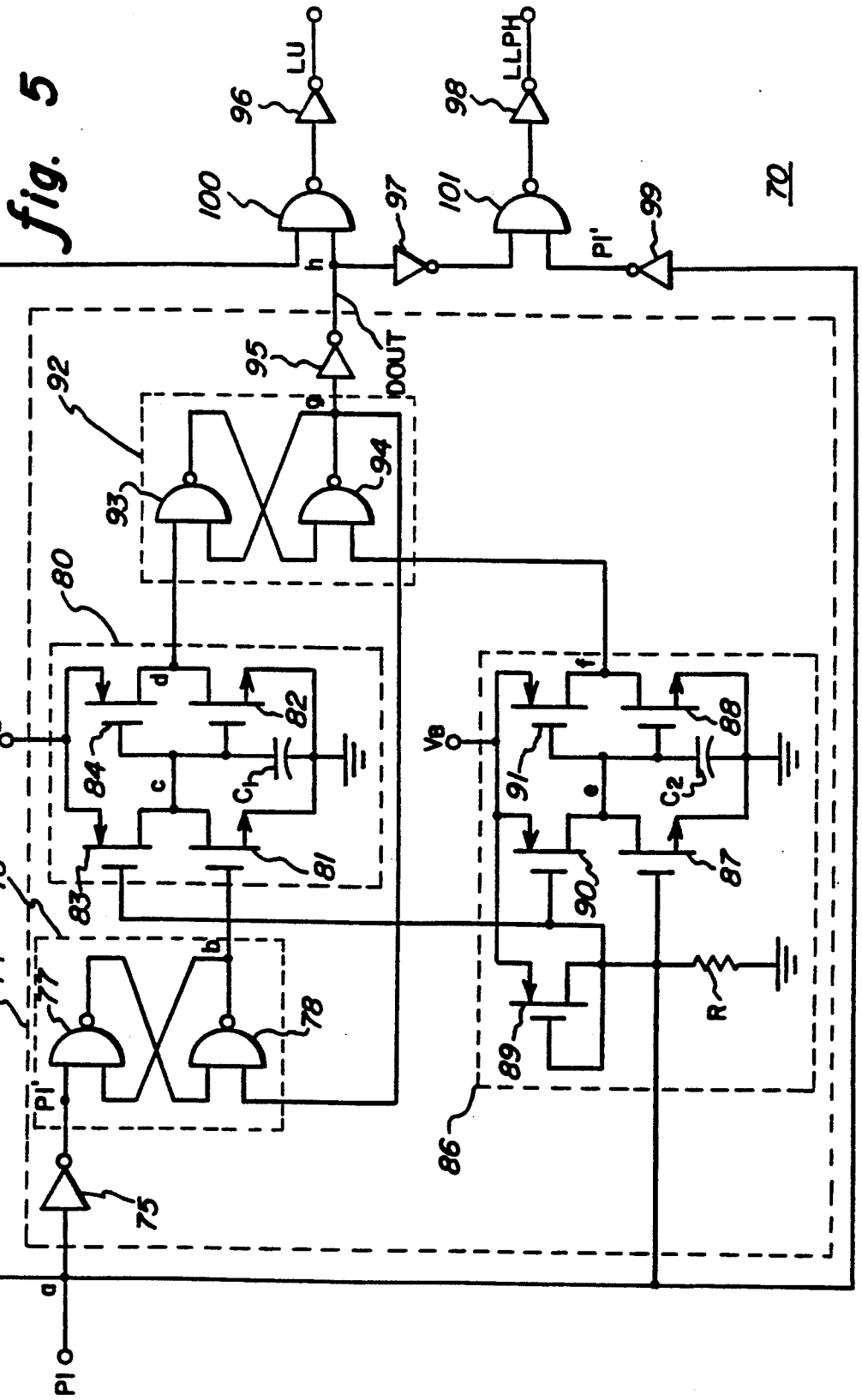
FIG. 5 is a schematic diagram of the dead time circuits of FIG. 2 in accordance with a preferred embodiment of the present invention.

A preferred embodiment of a dead time circuit in accordance with the present invention, such as dead time circuit 70 of FIG. 2A, including symmetrical delay means 74, is illustrated in FIG. 5. Pulse train P1 is inverted by an inverter 75, and the inverted signal P1' is provided to a latch circuit 76 comprising NAND gates 77 and 78. The output signal from latch circuit 76 is supplied to a turn-on delay circuit 80 which preferably comprises: NMOS switching devices 81 and 82; PMOS switching devices 83 and 84; and a capacitor $C_1$. As shown, in turn-on delay circuit 80, the drains of switching devices 81 and 83 are connected to each other and to the gates of devices 82 and 84, which are also connected to each other. Capacitor $C_1$ is connected between the gate of device 82 and the primary side common. Turn-on delay circuit 80 is coupled to a turn-off delay circuit 86 which preferably comprises: NMOS switching devices 87 and 88; PMOS devices 89, 90 and 91; a resistor R; and a capacitor $C_2$. As shown, in turn-off delay circuit 86, the drains of devices 87 and 90 are connected to each other and to the gates of devices 88 and 91, which are also connected to each other. The gates of PMOS switching devices 89 and 90 are connected together, and resistor R is connected between the gate of device 89 and the primary side common. Capacitor $C_2$ is connected between the gate of device 88 and the primary side common. The gate and drain of PMOS device 89 are tied together so that device 89 is always conductive and a constant current, the value of which is determined by the value of resistor R, flows therethrough. Furthermore, the gates of PMOS devices 83 and 90 are connected to the gate of device 89, thus forming a current mirror circuit for providing a controlled current for charging capacitors $C_1$ and $C_2$, as required. The output signals from turn-on and turn-off delay circuits 80 and 86 are supplied to another latch circuit 92, which comprises cross-coupled NAND gates 93 and 94. The output signal from latch circuit 92 is supplied to an inverter 95 and also comprises a reset signal input to NAND gate 78 of latch circuit 76. Dead time circuit 70 further comprises logic circuitry external to symmetrical delay means 74, including inverters 96-99 and NAND gates 100 and 101.

Figure 6:
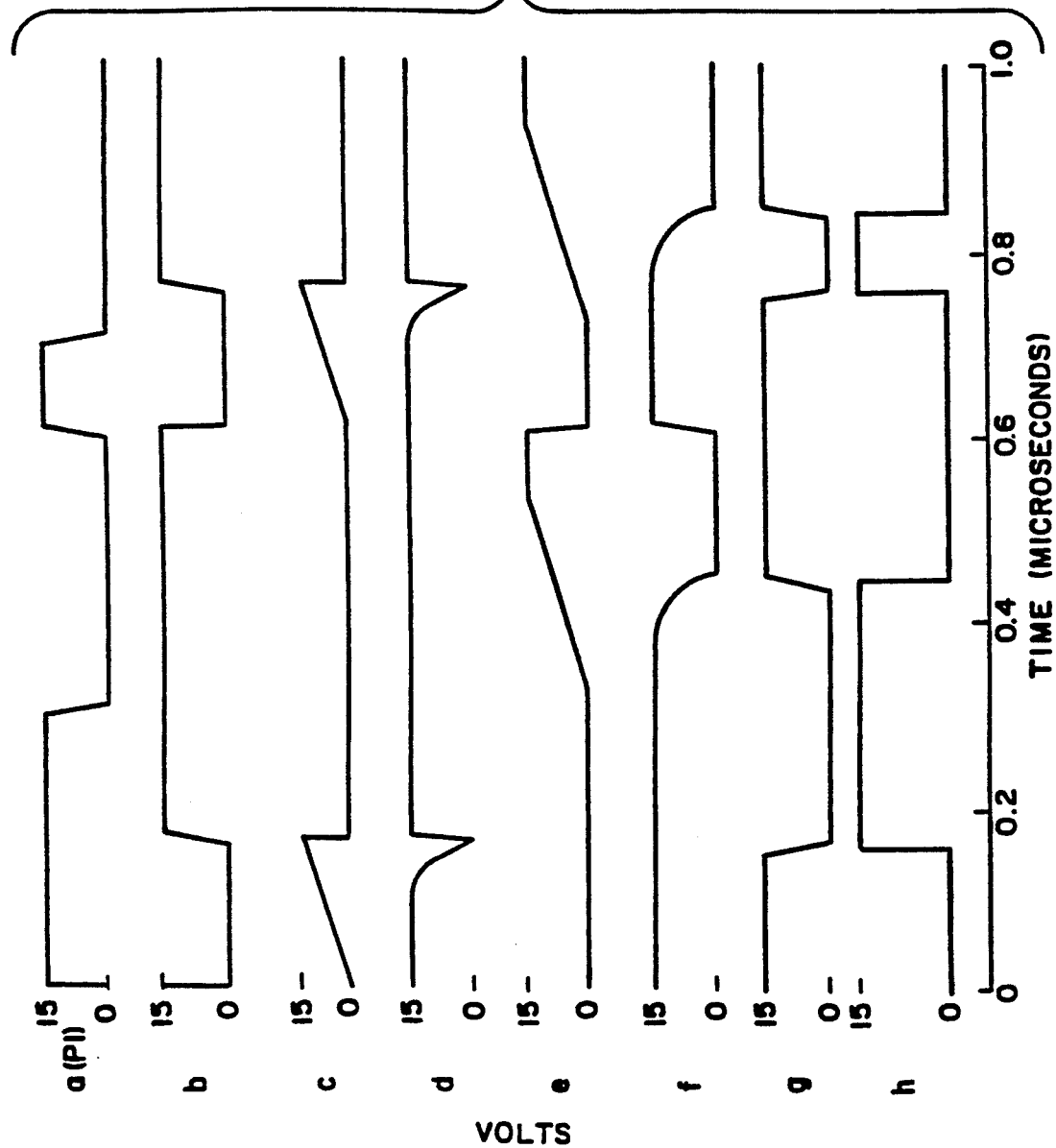
FIG. 6 is a timing diagram useful in understanding the dead time circuit of FIG. 5.

Operation of dead time circuit 70 will be described with reference to the timing diagram of FIG. 6. Pulse train P1 is supplied to inverter 75 at circuit node a and is inverted thereby to produce signal P1'. At node b, the output signal from latch circuit 76 toggles low on the falling edge of the inverted signal P1' (i.e. on the rising edge of signal P1 at node a). As a result, NMOS switching device 81 turns off, and PMOS switching device 83 provides a controlled current, via current mirror action, for charging capacitor $C_1$ at node c. Capacitor $C_1$ continues to charge until a sufficient voltage level is reached to turn on NMOS switching device 82. The charging of capacitor $C_1$ results in a predetermined time delay, e.g. 150 nanoseconds, which is determined by the value of capacitor $C_1$. When NMOS switching device 82 turns on, the voltage level at node d goes low, causing the output signal of latch 92 at node g to toggle low. The low output signal of latch 92 at node g resets latch circuit 76, causing the output signal of latch circuit 76 at node b to toggle high. On the other hand, a falling edge of the input signal P1 (at node a) turns off NMOS switching device 87 and allows PMOS switching device 90 to charge capacitor $C_2$ at node e by current mirror action. After the predetermined delay caused by the charging of capacitor $C_2$, a sufficient voltage level is reached to turn on NMOS switching device 88. As a result, the voltage level at node f goes low. The low output signal at node f resets latch circuit 92, causing the output signal of latch circuit 92 at node g to toggle high.

The output signal from latch circuit 92 (at node g) is inverted by inverter 95 to provide a symmetrically delayed signal DOUT at node h corresponding to pulse train P1. An AND operation is performed on delayed signal DOUT and pulse train P1 by a series combination of NAND gate 100 and inverter 96 to provide a left upper device drive signal LU for use in PWM and resonant modes of operation. Additionally, the resultant symmetrically delayed signal DOUT is inverted by inverter 97 and an AND operation is performed thereon with the signal P1' (from inverter 99) to provide a left lower device drive signal LLPH for use in phase shift control mode.

As shown in FIG. 2A, left upper device drive signal LU and right lower device drive signal RLPH are provided to a MUX 104. Similarly, right upper device drive signal RU and left lower device drive signal LLPH are provided to a MUX 102. If operation is in PWM or resonant control modes, as determined by mode selection input signal M, then the left upper device drive signal LU also comprises the right lower device drive signal RL; and the right upper device drive signal RU also comprises the left lower device drive signal LL. On the other hand, if operation is in the phase shift control mode, then the right lower device drive signal RL comprises the phase-shifted signal RLPH; and the left lower device drive signal LL comprises the phase-shifted drive signal LLPH. In either case, the upper device drive signals LU and RU are respectively supplied to a left upper on/off pulse generator 106 and a right upper on/off pulse generator 108 for providing on and off control signals (LUON, LUOFF; and RUON, RUOFF, respectively) to left upper and right upper device drive means 116 and 112, respectively, in a manner well-known in the art.

In accordance with the present invention, the output signals from pulse control means 42 are provided to a full-bridge/half-bridge MUX 110, as shown in FIG. 2B. A logic level signal is supplied to a selection input F/H of MUX 110, the value of which is dependent upon whether chopping means 12 (FIG. 1) is either a full-bridge or half-bridge converter. If full-bridge operation is enabled, then the RUOFF and RUON signals will be supplied only to right upper device drive means 112; the RL signal will be supplied only to a right lower device drive means 114; the LUOFF and LUON signals will be supplied to left upper device drive means 116; and the LL signal will be supplied to a left lower switch drive means 118. On the other hand, if half-bridge operation is enabled, then MUX 110 causes the LUOFF, LUON, and LL signals to be replaced by the RUOFF, RUON, and RL signals, respectively. As a result, the upper device drive means 112 and 116 are effectively combined in parallel, while the lower device drive means 114 and 118 are effectively combined in parallel, thereby doubling the drive power to each respective switching device. Alternatively, if desired, for half-bridge operation, the user may disable the left upper and lower switch drive means 114 and 118, rather than combining them in parallel with the corresponding right device drive means 112 and 114. Device drive means 112, 114, 116, and 118 each preferably comprise a series of totem pole drivers well-known in the art.

While the left and right lower device drive means 118 and 114 are operated at the relatively low voltage $V_B$, the left and right upper device drive means 116 and 112 are operated at the relatively high voltage $V_A$. Hence, high voltage level shifters are required to operate the left and right upper device drive means. As shown in FIG. 2B, the high voltage level shifters each comprise a controlled current source means 120 for controlling the corresponding input current of the left and right upper device drive means. Advantageously, by so using controlled current source means 120, external discrete level shifters are not needed. Such controlled current source means are described in Steigerwald et al. U.S. Pat. No. 4,694,384, cited hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A symmetrical delay circuit for independently delaying the rising and falling edges of an input digital data signal, comprising:

input latching means for latching the rising and falling edges, respectively, of said digital data signal;

turn-on delay means responsive to said input latching means for delaying said rising edges of said digital data signal, said turn-on delay means including a first capacitor for current-controlled charging to a predetermined level;

turn-off delay means responsive to said input latching means for delaying said falling edges of said digital data signal, said turn-off delay means including a second capacitor for current-controlled charging to said predetermined level;

a current mirror circuit for providing a controlled current for charging said first and second capacitors to said predetermined level; and output latching means for providing as an output signal the delayed rising and falling edges of said digital data signal, respectively.

* * * * *